(12) United States Patent
Weihrauch

(10) Patent No.: US 6,772,467 B1
(45) Date of Patent: Aug. 10, 2004

(54) BRUSH BRISTLE, METHOD OF MAKING SAME AND BRUSH COMPRISING SUCH BRUSH BRISTLES

(75) Inventor: Georg Weihrauch, Wald-Michelbach (DE)

(73) Assignee: Coronet-Werke GmbH, Wald-Michelbach (DE)

( * ) Notice: Subject to any disclaimer, the term of this patent is extended or adjusted under 35 U.S.C. 154(b) by 342 days.

(21) Appl. No.: 10/018,465

(22) PCT Filed: Jul. 13, 2000

(86) PCT No.: PCT/EP00/06688

§ 371 (c)(1),
(2), (4) Date: Dec. 19, 2001

(87) PCT Pub. No.: WO01/03544

PCT Pub. Date: Jan. 18, 2001

(30) Foreign Application Priority Data

Jul. 13, 1999 (DE) .......................... 199 32 376

(51) Int. Cl.[7] .............................................. A46D 1/00
(52) U.S. Cl. ........................ 15/207.2; 300/21; 428/373; 428/374; 428/397
(58) Field of Search ...................... 15/207.2; 300/21; 428/370, 373, 374, 397

(56) References Cited

U.S. PATENT DOCUMENTS

| | | | | |
|---|---|---|---|---|
| 2,100,138 A | * | 11/1937 | Friedrich | 15/179 |
| 2,207,158 A | * | 7/1940 | Neville et al. | 428/379 |
| 2,845,648 A | * | 8/1958 | Peterson | 15/207.2 |
| 3,016,554 A | | 1/1962 | Peterson | 15/207.2 |
| 3,327,339 A | * | 6/1967 | Lemelson | 15/209.1 |
| 3,403,070 A | * | 9/1968 | Lewis, Jr. | 428/376 |
| 3,577,839 A | * | 5/1971 | Charvat et al. | 15/179 |
| 4,144,610 A | * | 3/1979 | Moore et al. | 15/207.2 |
| 4,263,691 A | | 4/1981 | Pakarnseree | 15/207.2 |
| 4,462,136 A | * | 7/1984 | Nakao et al. | 15/167.1 |
| 5,032,456 A | | 7/1991 | O'Brien et al. | 428/398 |
| 5,466,505 A | | 11/1995 | Fukuda et al. | 428/91 |
| 5,791,740 A | | 8/1998 | Squillaci et al. | 300/21 |
| 5,933,906 A | | 8/1999 | Rackley | 15/167.1 |
| 6,161,243 A | * | 12/2000 | Weihrauch | 15/167.1 |

FOREIGN PATENT DOCUMENTS

| | | |
|---|---|---|
| DE | 90 12 603 | 2/1992 |
| DE | 197 05 104 | 8/1998 |
| DE | 197 48 733 | 5/1999 |
| DE | 198 38 201 | 9/1999 |
| DE | 198 18 345 | 10/1999 |
| EP | 0 444 436 | 9/1991 |
| FR | 1 070 805 | 8/1954 |
| GB | 2 325 401 | 11/1998 |
| WO | WO 94/10 539 | 5/1994 |
| WO | WO 97/25 902 | 7/1997 |
| WO | WO 98/26 117 | 6/1998 |
| WO | WO 99/24 649 | 5/1999 |

* cited by examiner

*Primary Examiner*—Mark Spisich
(74) *Attorney, Agent, or Firm*—Paul Vincent

(57) ABSTRACT

A bristle for brushware or brushes is described. The bristle is produced through cutting an extruded monofilament to length and tapers towards its useful end to form a kind of tip. The bristle is characterized in that it consists of at least two coextruded plastic components and has a shaft of a soft, elastic plastic material and a core of a harder elastic plastic material. The core projects past the shaft at its useful end thereby forming the tip. The bristle can also have a reinforcing jacket which surounds the shaft of the envelope. A method for producing such bristles is also described.

33 Claims, 4 Drawing Sheets

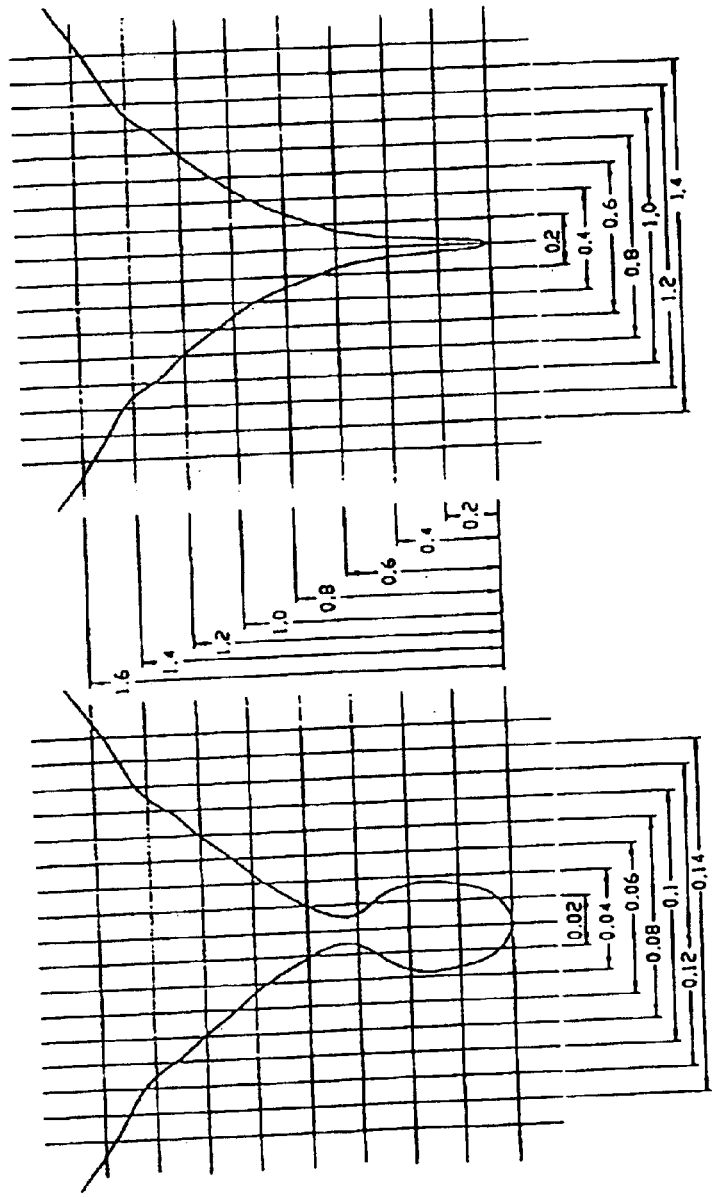

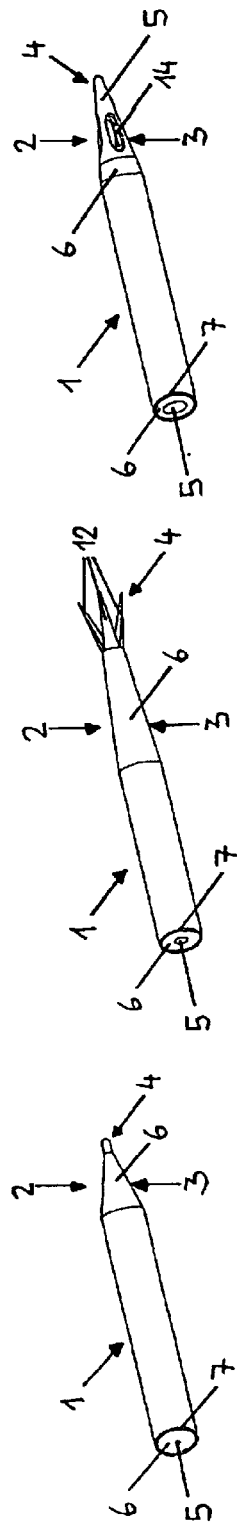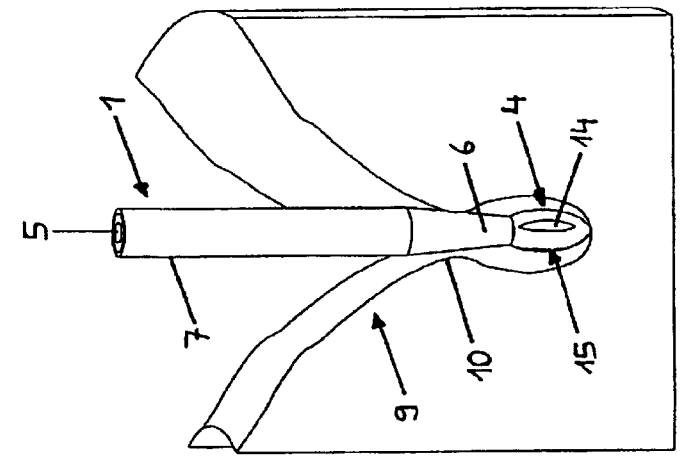
Fig. 6a  Fig. 6b
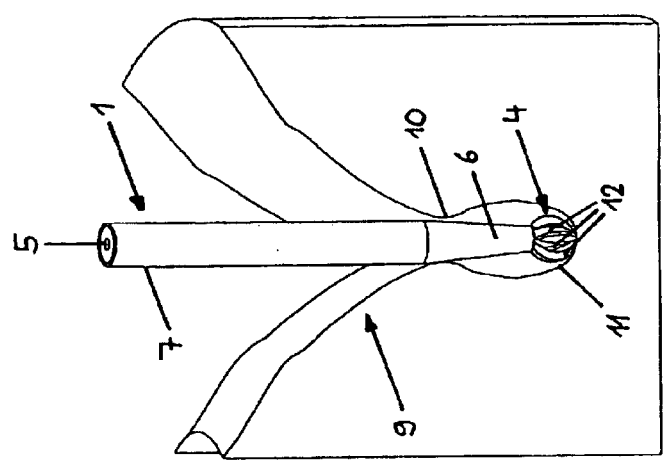
Fig. 5a  Fig. 5b
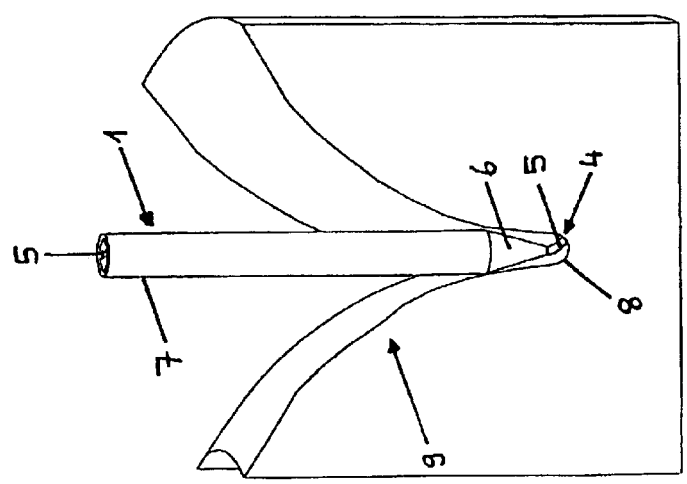
Fig. 4a  Fig. 4b

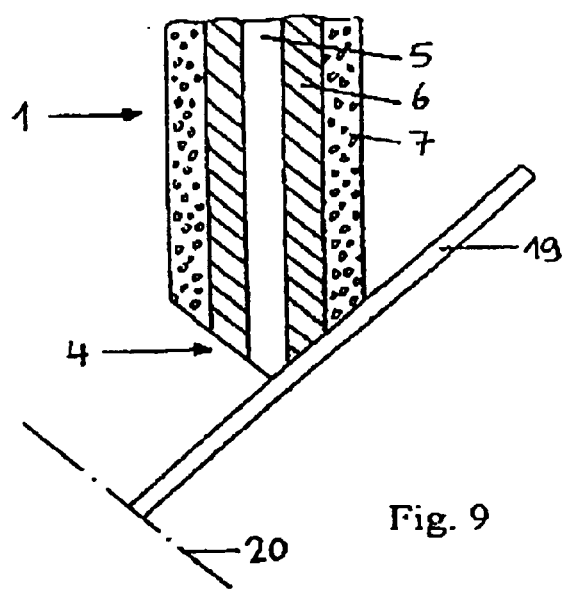
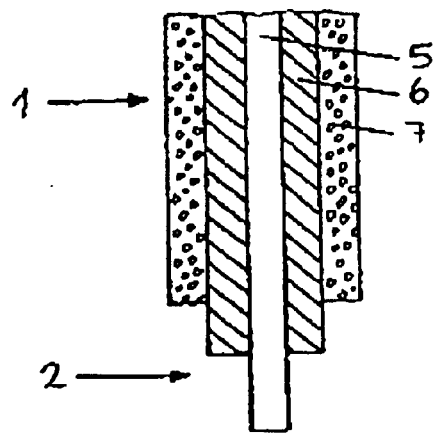
Fig. 9
Fig. 10
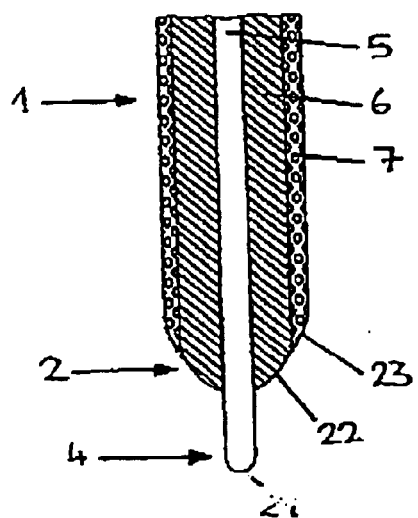
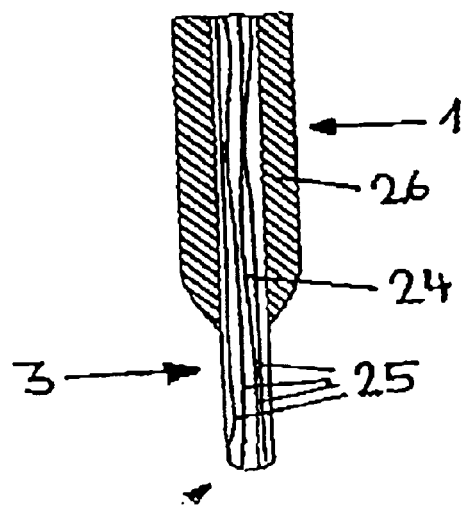
Fig. 11
Fig. 12

BRUSH BRISTLE, METHOD OF MAKING SAME AND BRUSH COMPRISING SUCH BRUSH BRISTLES

BACKGROUND OF THE INVENTION

The invention concerns a bristle for brushware or brushes, which is produced by cutting an extruded monofilament to length, and which tapers towards its useful end in a point-like manner, which is made from at least two co-extruded plastic components and has a shaft made from a soft elastic plastic and a core made from a flexible plastic which is harder than that of the shaft, wherein the core projects past the jacket at the use sided end to form a pointed tip. The invention also concerns a method for the manufacture of such bristles and a brush having such bristles.

The effectivity of a tooth brush for cleaning teeth and for tooth care depends mainly on the structure and function of the bristles in addition to the duration of the cleaning time. In the development of tooth brushes, the bristle material, bristle geometry, and the combination of the bristles within the bristle stock are therefore very important. The bristle stock or the bristles forming same must fulfil several functions in tooth care. They must reach the spherical lateral surfaces on the inner and outer sides of the teeth having largely varying curvatures and the useful end of the bristle and/or bristle jacket must work sufficiently effectively. Moreover, at least individual bristles of the bristle stock should penetrate into the interdental spaces from the inner and outer side of the teeth and the bristles should also exert a massaging action on the gum and, in particular, on the gum edges. Cleaning of the teeth and of the interdental spaces should, in conjunction with the dentifrice used, not only prevent plaque build-up but also remove existing plaque to prevent caries.

Dental tests have shown that in countries where caries prophylaxis is practiced, caries is rarely found on free and substantially flat tooth surfaces because these surfaces are easy to reach and clean with conventional dental hygiene means, such as tooth cleaning means, i.e. tooth brushes, dental floss etc. Moreover, prophylactic dentifrices which contain e.g. fluorides, can easily reach and treat these surfaces.

Recent studies have shown that approximately 80% of caries originates in the so-called dental fissures most of which are located on the chewing surfaces of the molars and premolars, which are therefore more prone to caries and to larger cavities. These gap-like fissures of very narrow cross-sections are, in and of themselves, an ecosystem which are difficult or impossible to reach with conventional tooth brushes and which foster undisturbed development of caries-generating plaque. Nor do dentifrices reach these locations to a sufficient degree. Additionally, the enamel at the bottom of the fissures is very thin and contains few minerals which even enhances caries formation at these locations.

Modern dental medicine classifies such fissures according to their geometrical shape into U- V- and I-shaped fissures. These represent approximately 93% of the fissures examined. So-called ampoule-shaped fissures have a considerably reduced occurrence of approximately 7%. These fissures narrow like a funnel to a narrowest location and then widen again like a sack. Additionally, all fissures are curved in their longitudinal extension and the funnel axis is often tilted or curved. Cleaning of these fissures would require extremely thin bristles which would deflect under the smallest loads due to their insufficient bending strength. Fine thin bristles or bristles having finely drawn ends are also desired in other fields, e.g. cosmetic brushes or brushware.

DE 90 12 603 U proposes conification of the bristle ends and at least partially providing the bristle stock of a tooth brush with such bristles to be able to also reach, in particular, the interdental spaces and highly rugged surface structures. The same purpose is fulfilled by a two component bristle (GB 2 325 401 A) having the pre-characterizing features of claim 1. It is made from a shaft of soft elastic plastic e.g. nylon and a core which is harder than the shaft e.g. polyester, so that the conically tapered tip is substantially formed by the harder core. Another two component bristle (WO97/25 902A) has a core made from a plurality of monofilaments projecting past a closed jacket.

No concically tapered tip is envisioned nor would one be possible.

In a known tooth brush having a similar bristle design (EP 0 596 633), the main task is to achieve an improved flexibility in the region of the bristle ends with densely packed bristles and corresponding stability of the bundle, in order to, in particular, guarantee cleaning in the region of the gingival border without injuring the gingiva. Moreover, bristles are known (WO99/24649) which are separated at their ends into flags thereby mainly producing intensification of the bristle action due to multiplication of the bristle ends and action of the individual bristles over a larger surface region due to the flags.

Bristle tips have also been conventionally shaped by inserting them into a solvent—as in dip varnishing—and slowly removing them thereby dissolving the plastic material of the bristle. The bristle end remains in the solvent bath for the longest period of time to thereby form bristles with pointed ends. The method is expensive, environmentally harmful, and the formation of the tip cannot be exactly controlled such that each bristle has a different geometrical shape at the end and therefore a different bending and wear behavior.

Pulsed extrusion of monofilaments is also known to obtain a monofilament with varying diameter. The monofilament is cut in the region of the constriction to obtain bristles having tapered ends. Pulsed extrusion cannot be carried out at the large frequencies which would be required for the short bristle lengths of many applications, thereby producing a substantial amount of waste. Moreover, the ends would have irregular shapes.

It is therefore the underlying purpose of the invention to introduce a bristle with tapering bristle end corresponding to GB 2 325 401A which has sufficient bending strength and simultaneously good action of the bristle end. The bristle should furthermore be designed such that it can be produced with reproducible properties.

SUMMARY OF THE INVENTION

A bristle of this type is characterized in accordance with the invention in that the soft elastic shaft is additionally surrounded by a jacket made from a plastic which stiffens the shaft.

The inventive bristle has a distinct tapering which permits penetration of the end into narrow gaps, e.g. into the fissures of teeth down to the fissure bottom and permits action on the fissure wall and fissure bottom by elastic deflection. The bristle core thereby provides sufficient bending strength and at the same time good elasticity. The soft, preferably rubber-elastic shaft has similar effects as an eraser due to its higher coefficient of friction. It achieves a more uniform cleaning action since the soft material adjusts well to uneven surfaces.

The degree and length of the tapering are matched such that the bristle end does not deflect, and thereby become ineffective, under small loads. The tapering bristle end is guided by the bristle shaft such that it can penetrate into narrow gaps, e.g. fissures, without premature bending of the bristle itself. The inventive bristle permits very precise application of media, e.g. cosmetics, lip gloss, eye liner etc.

The plastic materials of the core and of the shaft can be mainly selected with regard to their intended function, whereas the bristle jacket provides the required bending strength. When the bristle is bent, the jacket can effect additional cleaning or polishing.

As mentioned above, the shaft is preferably made from a rubber-elastic plastic material, in particular from an elastomer.

In a further preferred embodiment, the shaft and/or jacket extend conically towards the tip of the core, wherein the conical angle defines the bending behavior of the bristle end.

In a further advantageous embodiment, the core also tapers conically such that the conical length defines its bending behavior.

In another variant or in addition to the conical shape, the core can be disposed in the shaft in an axially displaceable fashion to adjust that free length of the core which projects past the shaft to the respective application.

To achieve the same object, the shaft and the jacket may be axially displaceable relative to one another to realize a stepped bristle comprising several components. In both above-mentioned embodiments comprising jacket, shaft and core, their different properties, substantially determined by their materials and geometry, can be effective in the region of the bristle end.

The core can have a round tip to prevent excessive action for short free lengths.

In a preferred embodiment, the core and the jacket are made from a thermoplastic material, whereas the shaft is preferably formed from a thermoplastic elastomer. Suitable thermoplastic materials are polyamides, polyester and also polyethylene or polypropylene.

The above-mentioned plastic materials can be fashioned by extrusion or coextrusion into endless monofilaments from which the bristles are then cut to the desired length.

The conical shape or the length of the conical end can be adjusted to the purpose of use and—for reasons of stability—to the cross-section of the bristle.

The tapering can have a maximum length of 2mm, preferably between 0.1 and 1.00 mm, wherein the smallest diameter in the region of the outermost end should be between 0.01 and 0.03 mm. At a separation of 0.6 mm to approximately 1 mm from the bristle tip, the bristle diameter can expand progressively to the conventional size.

In a further advantageous fashion, at least the core is split once or several times in the region of its free end such that the bristle end elastically bends and spreads along the gaps when loaded. This produces an additional action on the walls of ampoule-shaped widenings, in particular of ampoule-shaped fissures which is also supported by the frictional effect of the shaft. Monofilament bristles of similar type which permit a directed spreading are described e.g. in WO 99/24649. In contrast thereto, the inventive bristle is characterized by even thinner "flags" which are evenly packaged through integration into the shaft. The core is substantially produced according to methods described in WO 99/24649.

In accordance with another embodiment, at least the core of the bristle is split once or several times at a separation from its end such that when the bristle end is loaded, only the split region bulges under compression, thereby maintaining its closed end. This, too is a resilient process with corresponding restoring force. The bulge widens the cross-section and the curved bristle sections and edges act on the gaps, in particular of ampoule-shaped fissures.

In a further embodiment, the core can consist of two or more monofilaments whose free ends function as fibers.

In a further embodiment of the invention, the cross-section of the bristle has a material structure which changes from the inside to the outside. It can be realized by coextrusion of different materials or by defined embedding of fillers, e.g. color pigments, in the outer region.

It is thereby recommended to provide the material structure of the core with high elasticity and abrasive resistance and the jacket with a high bending strength. The inventive bristle is preferably produced by coextrusion of core and shaft, and optionally also the jacket, as a multiple component filament. Alternatively, the jacket can be extruded onto a coextruded shaft and core structure.

In a further embodiment, the bristle comprises abrasive means which are embedded at least in the region of the soft shaft to further support the "abrasive" cleaning effect.

Moreover, at least the shaft and the core may have different colors for visualization of their respective effects and to thereby simultaneously provide a kind of wear display, since the tapering core will generally be worn before the soft shaft such that the color of the core will gradually disappear.

The invention also concerns a method for producing bristles having the above-described structure. The multiple component monofilaments obtained by extrusion, larger strand sections of such monofilaments, or bristles cut to length are clamped at a separation from the free end, supported with the core on a circulating grinding surface, and conified through grinding at an inclination with respect to that grinding surface of approximately the cone angle. The applicant describes a technique suitable therefor in EP 0 444 436 A1.

In addition, the bristle can also be supported on the grinding surface at the jacket. This support permits exact conification of the soft rubber-elastic shaft which would otherwise be difficult to grind, and can be very precisely defined by corresponding setting of the cone angle.

Instead or additionally, the core and the shaft can be axially displaced relative to one another until a partial length of the core projects past the shaft. In the same fashion, the jacket and the shaft can be axially displaced relative to one another until a cylindrical partial length of the shaft projects past the jacket.

If the bristle is not conified before axial displacement, it assumes a stepped profile which tapers towards the free end. If conification takes place before, the components forming the bristles merge via inclined surfaces.

The method described by the applicant in EP 0 346 646 A1 is particularly advantageous for such bristle "topography".

The invention also concerns a brush, in particular a tooth brush, comprising a bristle support and a bristle stock mounted thereto having individual bristles or bristles combined into bundles or groups. Such a brush is characterized in that the bristle stock comprises, at least partially, the above-described inventive bristles. These bristles may be optionally disposed only in defined regions of the bristle stock.

In the same manner, the invention can also be used in optionally replaceable tooth brush heads in powered (electrical) tooth brushes in that the bristle stock of such a replaceable tooth brush head is provided with the inventive bristles, optionally, in defined regions only. In particular, a rotary drive produces a particularly good effect in narrow gaps, fissures or the like. Spreading of split bristles is thereby supported by the centrifugal action.

If the bristle stock also comprises other, conventional bristles in addition to the inventive bristles, the latter preferably project past the former to be effective when first applying the brush. The applicant's method according to EP 0 346 646 A1 is recommended for bringing the ends of all bristles of a bristle stock to different levels.

BRIEF DESCRIPTION OF THE DRAWING

The invention is described below with respect to some embodiments shown in the drawing.

FIG. 1a shows a schematic representation of a first typical fissure shape;

FIG. 1b shows a schematic representation of a second typical fissure shape;

FIG. 1c shows a schematic representation of a third typical fissure shape;

FIG. 1d shows a schematic representation of a fourth typical fissure shape;

FIG. 2 shows a measurement diagram of an ampoule-shaped fissure in accordance with the statistical average;

FIG. 3 shows a measurement diagram of the other three fissure shapes in accordance with the statistical average;

FIG. 4a shows a schematic representation of an embodiment of three component bristle;

FIG. 4b shows a representation of the effects of the embodiment of FIG. 4a;

FIG. 5a shows another embodiment of the bristle;

FIG. 5b shows the effects of the bristle of FIG. 5a;

FIG. 6a shows another embodiment of the bristle;

FIG. 6b shows the effects of the bristle of FIG. 6a;

FIG. 7b shows the effects of the bristle of FIG. 7a;

FIG. 8b shows the effects of the bristle of FIG. 8a;

FIG. 9 shows a schematic illustration of the method for conifying the bristle;

FIG. 10 shows an embodiment of a three-component bristle in an enlarged section;

FIG. 11 shows a further embodiment of a two-component bristle in an enlarged partial view; and FIG. 12 shows an embodiment of a two-component bristle with a core of monofilaments.

DESCRIPTION OF THE PREFERRED EMBODIMENT

Figure 7A:
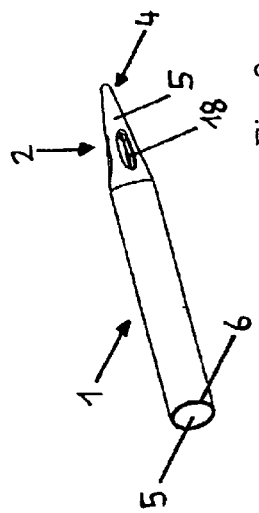
FIG. 7a shows an embodiment of a two component bristle.

The fissure shapes occurring in practice are shown in FIG. 1. FIG. 1a) shows the most critical form with respect to dental hygiene, namely the so-called ampoule shape which initially tapers down like a funnel to the most narrow point and subsequently widens again like a sack. The fissure in accordance with FIG. 1b) is also difficult to reach, the so-called I-shape which has a deep and narrow funnel shape. The V-shape in accordance with FIG. 1c) having funnel walls which are widely spread is more favorable as is the U-shape in accordance with FIG. 1d) having a U-shaped fissure bottom. The statistical distribution of the series shown in FIGS. 1a) to d) of the different fissure shapes is approximately 7%/11%/21%/61%.

FIG. 2 shows a measurement diagram for ampoule-shaped fissures in accordance with FIG. 1a) which shows the width (abscissa) for a given depth (ordinate). FIG. 3 likewise shows a measurement diagram for the other fissure shapes, wherein the width (abscissa) of 90% of the fissures is greater than or equal to the value given. For ampoule-shaped fissures in accordance with FIG. 2, the width at the most narrow point located at a separation of approximately 0.6 mm from the fissure bottom is only approximately 0.01 mm. At the same separation from the fissure bottom, the width of the fissures in accordance with FIG. 3 is almost ten times larger.

The following representations show a series of bristles of different bristle end design. FIG. 4a) shows a bristle 1 which is formed e.g. of a three-component filament. It is substantially cylindrical and merges at its useful end 2 via a conically tapering region 3 into a substantially cylindrical tip 4 with a rounded end. It consists of a core 5, forming the tip, e.g. of a polyamide, a shaft 6 of a soft-elastic material, e.g. an elastomer and a reinforcing jacket 7 e.g. of polyamide. The cylindrical region of the bristle 1 has sufficient bending strength for insertion of the bristle end 2 and in particular the tip 4 e.g. into the fissure in accordance with FIG. 4b). The bristle end 2 penetrates to the bottom 8 of the fissure. When the bristle end 2 meets the fissure bottom 8, it is elastically deflected such that the deeper regions in the fissure 9 are also acted upon and cleaned by the tapering region 3 and the bristle tip 4. At the same time, the shaft 6 rubs against the wall of the fissure 9.

In the embodiment of FIG. 5a), the bristle 1 again consists of a substantially cylindrical filament with a conically tapering end 2. The bristle 1 or its core is slitted once or several times starting from the pointed end 4. This bristle is particularly suited for ampoule-shaped fissures as shown FIG. 5b). When the bristle 1 penetrates into the fissure 9, it passes the most narrow portion 10 of the fissure 9 in the region of its conical end 2 until it meets the bottom 11. Under small loads, the bristle end 4 spreads open along the slits to form finger-like ends 12 which act on the fissure bottom 11 and the walls of the ampoule-shaped widenings In this case as well, the conical region of the shaft 6 also principally cleans the narrow portion 10. When the pressure is reduced, the elastic restoring force returns the spread ends 12 to their initial position.

FIG. 6a) shows a bristle 1, also with cylindrical jacket 7 and a bristle end 2 which tapers towards a tip 4, wherein the diameter of the core 5 is larger than that of the bristle of FIG. 4 thereby reducing the wall thickness of the shaft 6.

The bristle end 2 is slitted once or several times at its core 5 at a separation from the tip 4 as indicated by the slit 14. When the bristle 1 penetrates the ampoule-shaped fissure 9 and the bristle end 2 meets the fissure bottom 11, the conical section of the bristle end 2 bulges as shown e.g. at 15. This also produces intensive cleaning of the ampoule-shaped fissure, while the larger cross-section of the bristle shaft 6 acts at the most narrow portion 10.

Figure 7B:
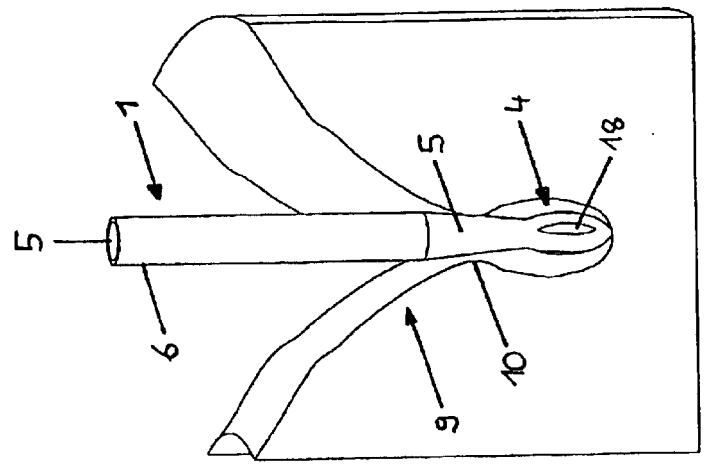

In the embodiment of FIG. 7a) and 8a), the bristle 1 consists of only two components, namely the core 5 and the shaft 6, wherein the core is again made from a stiff plastic material and the jacket 7 from a soft-elastic plastic material. The conically tapering end 2 of the bristle 1 or the core 5, extending in the form of a point, has slits 16 which start at the end and which, in the embodiment shown, are closed when not in use. When the bristle 1 penetrates into a fissure 9, the tapering bristle end 2 passes the narrow point 10 of the ampoule-shaped fissure 9 until it finally meets the bottom 11 of the fissure and the end 4 spreads along the slits 16 to produce finger-like elements 17 which clean, in particular, the fissure bottom (FIG. 7b)).

Figure 8A:
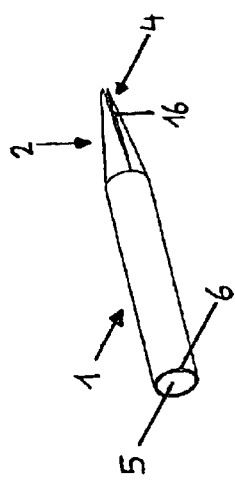
FIG. 8a shows another embodiment of a two component bristle.
Figure 8B:
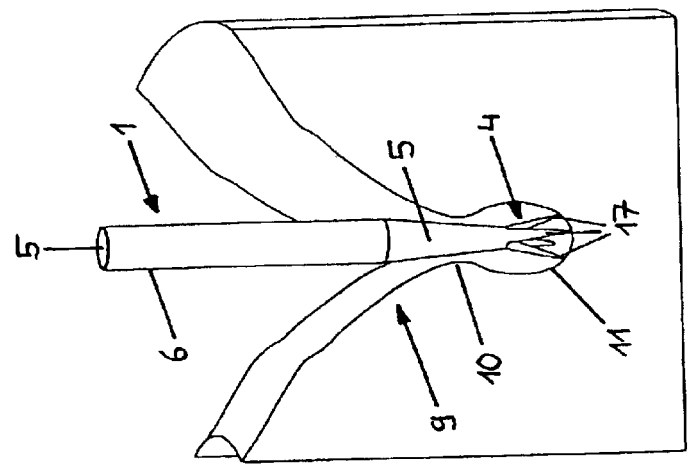

The embodiment according to FIG. 8a) corresponds substantially to that of FIG. 6a). However, the bristle 1 does not have a jacket 7 as in the embodiment of FIG. 7a). The core 5 tapers in the region of the tapering end and has a gap 18 at a separation from the tip 4. The bristle 1 in accordance with FIG. 8a) substantially functions in the same way as in FIG. 6b), as is shown in FIG. 8b).

FIG. 9 shows a schematic view of the technique for conifying the bristles in accordance with FIGS. 4 through 6. Reference numeral 19 in FIG. 9 designates a grinding surface which rotates about an axis 20. The axis of the bristle 1 which consists of core 5, shaft 6 and jacket 7 is oriented, with respect to the grinding surface 19, at approximately the desired conical angle. The bristle 1 is only initially supported at the jacket and, for increased abrasion, also on the core 5. Since both the jacket 7 and core 5 are made from a stiff material, both these as well as the intermediate shaft 6 of soft-elastic material are properly abraded to thereby produce a precisely conified tip 4.

In the embodiment of FIG. 10, the bristle again comprises a core 5, a shaft 6 and a reinforcing jacket 7 which are coextruded and which can be axially displaced with respect to one another. This can be realized through corresponding selection of the plastic materials used or through sliding means in the bordering layers which are applied during extrusion. The shaft 6 is axially displaced towards the free end 4 with respect to the jacket 7. The core 5 is likewise displaced with respect to the shaft 6, however, by an increased length to produce, in total, a tapering end 2, wherein core 5, shaft 6 and jacket 7 are disposed in a stepped fashion. If the bristle 1 is conified before axial displacement in accordance with FIG. 10, the steps are eliminated and inclined transition surfaces are produced.

In the embodiment of FIG. 11, the bristle 1 again consists of a core 5, a soft elastic shaft 6 and a reinforcing jacket 7 which contains fillers, e.g. abrasive particles or the like as indicated in the drawing. After cutting, the bristle 1 is initially rounded at its end through grinding or the like. The core 5 is then axially displaced towards the end relative to the shaft 6 and the jacket 7 such that it projects past the shaft 6 and with its rounded free end. The shaft 6 is likewise rounded at its free end 22 and the jacket 7 is also rounded at 23.

FIG. 12 shows a bristle 1 with a tapering end 3 which consists of a shaft 26 of a soft-elastic material and a core 24 of several monofilaments 25, wherein the core 24 or the monofilaments 25 also project past the shaft 26 to form the tip 4 of the bristle 1.

What is claimed is:

1. A bristle for brushware or brushes, the bristle produced by cutting an extruded monofilament to length, the bristle comprising:
   a core of hard flexible plastic material;
   a shaft surrounding said core, said shaft made from a soft elastic plastic material; and
   a jacket surrounding said shaft, said jacket made from a material which reinforces said shaft, wherein said core projects past said shaft at a use end of the bristle to give the bristle a tapered, pointed tip.

2. The bristle of claim 1, wherein said shaft consists essentially of a rubber-elastic plastic material.

3. The bristle of claim 1, wherein said shaft consists essentially of an elastomer.

4. The bristle of claim 1, wherein at least one of said shaft and said jacket extend conically towards a tip of said core.

5. The bristle of claim 1, wherein said core has a conical tip.

6. The bristle of claim 1, wherein said core and said shaft can be axially displaced relative to one another.

7. The bristle of claim 1, wherein said shaft and said jacket can be axially displaced relative to one another.

8. The bristle of claim 1, wherein said core is rounded at its tip.

9. The bristle of claim 1, wherein said core is made from one of a thermoplastic material, polyamide, and polyester and said shaft consist essentially of a thermoplastic elastomer.

10. The bristle of claim 9, wherein said thermoplastic material is one of polyamide, polyethylene, polypropylene, and polyester.

11. The bristle of claim 1, wherein said jacket consists essentially of one of a thermoplastic material, polyamide, and polyester.

12. The bristle of claim 1, wherein the bristle extends conically along a partial length of up to 2 mm.

13. The bristle of claim 1, wherein the bristle extends conically along a partial length of between 0.1 and 1 mm.

14. The bristle of claim 1, wherein a diameter of said core at said pointed tip is between 0.01 and 0.03 mm.

15. The bristle of claim 1, wherein said core can be split at least once in a region of its exposed end and can be spread beginning at said exposed end.

16. The bristle of claim 1, wherein said core is split at least once proximate its exposed end at locations spaced apart from said exposed end, wherein said split locations bulge elastically when pressure is exerted on said exposed end.

17. The bristle of claim 1, wherein said core consists essentially of at least two thin monofilaments.

18. The bristle of claim 1, wherein a cross-section of a material structure of the bristle changes from inside to outside.

19. The bristle of claim 1, wherein said core has a material structure of high elasticity and abrasion resistance and said jacket has high bending strength.

20. The bristle of claim 1, wherein the bristle is produced through co-extrusion of at least two of said shaft, said core, and said jacket.

21. The bristle of claim 1, wherein the bristle is produced through extrusion of said jacket onto a co-extruded shaft and core.

22. The bristle of claim 1, further comprising abrasive means embedded in at least a region of said soft shaft.

23. The bristle of claim 1, wherein at least said shaft and said core have different colors.

24. Method for producing the bristle of claim 1, wherein a use end section of the bristle is conified through grinding by clamping it at a separation from its free end, wherein said core is supported on a circulating grinding surface and set at an inclination with respect to that circulating grinding surface corresponding substantially to a cone angle.

25. The method of claim 24, wherein the bristle, including said core and jacket, is supported on said grinding surface.

26. The method of claim 24, wherein at least one of said core, said shaft, and said jacket are stepped, wherein part of a length of at least one of said shaft and said jacket is conical.

27. A method for producing the bristle of claim 1, wherein said core and said shaft are axially displaced relative to one another until part of a length of said core projects past said shaft.

28. A method for producing the bristle of claim 1, wherein said jacket and said shaft are axially displaced relative to one another until a cylindrical partial length of said shaft projects past said jacket.

29. A brush, comprising a bristle support and a bristle stock mounted thereto, the bristle stock comprising individual bristles or bristles combined into bundles or groups, wherein said bristle stock at least partially comprises the bristles of claim 1.

30. The brush of claim 29, wherein the bristles are disposed only in defined regions of said bristle stock.

31. The brush of claim 29, wherein said brush is one of a toothbrush and a driven tooth brush.

32. The brush of claim 31, wherein the bristles are only disposed in defined regions of said bristle stock.

33. The brush of claim 29, wherein the bristles project past other bristles in said bristle stock.

\* \* \* \* \*